June 2, 1964     R. E. TOMEK     3,135,903
COUPLING MEANS FOR CONTROL SYSTEMS
Filed Feb. 8, 1961     2 Sheets-Sheet 1

INVENTOR
REINHOLD E. TOMEK
BY Paul D. Carmichael
ATTORNEY

June 2, 1964 R. E. TOMEK 3,135,903
COUPLING MEANS FOR CONTROL SYSTEMS
Filed Feb. 8, 1961 2 Sheets-Sheet 2

United States Patent Office 3,135,903
Patented June 2, 1964

3,135,903
COUPLING MEANS FOR CONTROL SYSTEMS
Reinhold E. Tomek, Endicott, N.Y., assignor to International Business Machines Corporation, New York, N.Y., a corporation of New York
Filed Feb. 8, 1961, Ser. No. 87,829
8 Claims. (Cl. 318—31)

This invention relates generally to coupling means for control systems and more particularly to a highly improved and simplified shaft coupling for positioning an output member in response to the position of an input member.

In many applications it is necessary to drive an output member in accordance with the position of an input member wherein the input member has very little torque applied thereto. For example, in data-handling systems, it may be necessary to convert the output of a transducer which possesses very little output torque directly to digital information by means of a digital converter. Follow-up systems, utilizing optical means, are known in the art and have been used as couplings to drive an output member in response to the position of an input member with no torque being taken from the input member.

However, such prior art follow-up systems are generally characterized by their extreme complexity in apparatus and operation. The complexity of the various systems, including generally circular shields positioned between a radiation source and a radiation responsive device, complex lens and shutter arrangements and auxiliary connections between members mounted on the input and output members, has severely limited the use thereof. Also, these devices usually possess a false stable null. In other words, at a position 180° from the true null position, the device will stabilize at a false null. This, of course, will produce a false output causing the output member to stabilize at a position diametrically opposite to the position of the input member.

Briefly, the present invention relates to a highly improved and simplified torqueless coupling wherein a pair of oppositely monitored radiation responsive devices are rotatable with an output member and electrically connected in a circuit controlling reversible drive means which positions the output member. A shutter is rotatable with an input member for properly directing the radiation emanating from a suitable radiation source to the radiation responsive devices. The arrangement is such that movement of the input member will cause greater radiation reception at one or the other of the oppositely monitored radiation responsive devices in accordance with the directional movement of the input member. The drive means will rotate the output member toward a stable null position in response to the output signals from the oppositely monitored radiation responsive devices.

It is the primary or ultimate object of this invention to provide a coupling means for control systems wherein an output member is caused to follow an input member which is highly simplified in construction and operation and which possesses no stable false nulls.

It is another object of the invention to provide a coupling means for control systems wherein an output member follows very accurately the movement of an input member possessing little torque and none of the torque is utilized in the follow-up system.

A further object of the invention is to provide coupling means for control systems having the characteristics above described wherein no physical obstruction or connection is required between the input member and the output member. In this manner one portion of the follow-up system may be disposed to one side of a transparent barrier and the other portion of a follow-up system may be disposed on the opposite side of this transparent barrier. The output member will faithfully and accurately follow movements of the input member and will not stabilize at a false null position.

Still a further object of the invention is to provide a coupling means for control systems which is extremely compact and rugged for use in airborne applications or or the like.

The foregoing and other objects, features and advantages of the invention will be apparent from the following more particular description of a preferred embodiment of the invention as illustrated in the accompanying drawings.

Figure 1:
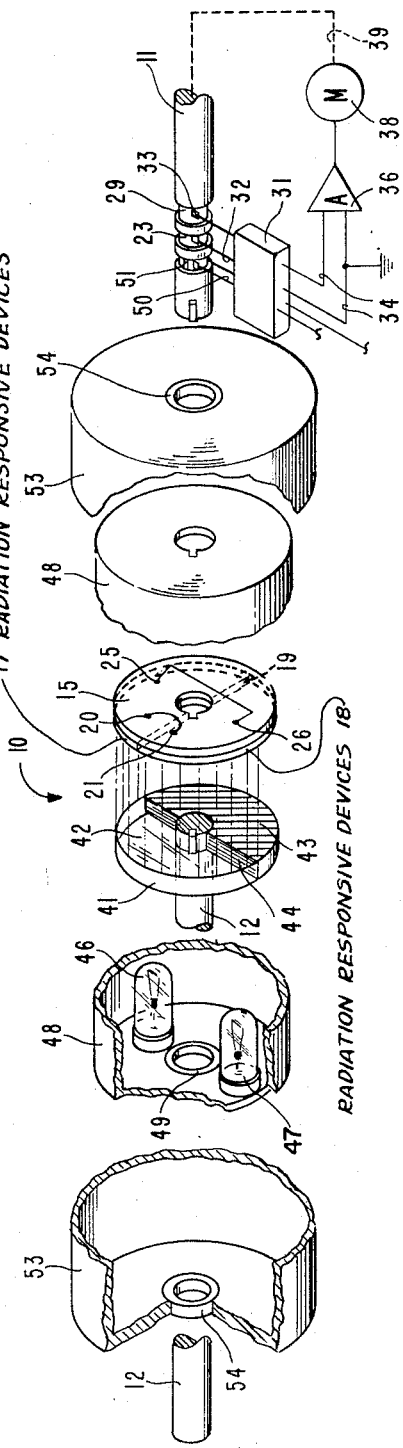
FIGURE 1 is an exploded perspective view of the mechanical components of coupling means constructed in accordance with the teachings of the present invention.

Referring now to the drawings, and initially to FIGURE 1 thereof, the reference numeral 10 designates generally a coupling means constructed in accordance with the teachings of the present invention. The coupling means 10 is adapted to position an output shaft 11 in response to the position of an input shaft 12. The input shaft 12 may be driven by any suitable means, such as a transducer, and is characterized by its low driving ability or torque. The input shaft 12 and the output shaft 11 are axially aligned and, as will be hereinafter more fully apparent, no physical connection or obstruction is required between the input and output shafts.

The coupling means 10 comprises a mounting disc 15 which is rigidly mounted or keyed on the end of the output shaft 11. Attached to the forward face of the mounting disc 15 are a pair of semicircular radiation responsive devices 17 and 18. The devices 17 and 18 are mounted in abutting relation along a diameter 19 of the mounting disc 15 whereby each of these devices covers half of the forward surface area thereof. The radiation responsive devices 17 and 18 may each comprise a voltage generating photocell. While photocells are disclosed in connection with the illustrated embodiment of the invention, it should be clearly understood that other radiation responsive devices whose outputs vary in accordance with the areas thereof illuminated by radiation emanating from a radiation source may be employed. It is only necessary that a measurable change in the output of a radiation responsive device be provided for a change in the area of the device illuminated. The photocells 17 and 18 are preferably matched—that is, their characteristic curves of output versus area illuminated are the same—and these photocells are preferably operated in the unsaturated portions of their characteristic curves.

The photocells 17 and 18 are oppositely monitored and connected in an electrical circuit to provide control signals for a device driving the output shaft 11. Two opposite output terminals 20 and 21 of the photocells 17 and 18 are connected by a conductor 22 to a first commutator ring 23 of conducting material on the output shaft 11. The output shaft is hollow for a portion of its length adjacent the forward end thereof and the conductor 22 extends internally of the output shaft. The other two opposite output terminals 25 and 26 of the photocells 17 and 18 are connected by a conductor 28 extending within the output shaft 11 to a second commutator ring 29 of conductive material on the output shaft. Elecrical connection is made with the commutator rings 23 and 29 by means of a brush assembly 31 having spring-biased brushes 32 and 33 which engage these commutator rings.

The brushes 32 and 33 are connected to conductors 34 which serve as inputs to a direct current amplifier 36. One of the conductors 34 is grounded and the amplifier 36 is supplied with signals corresponding to the difference in the areas of illumination of the photocells 17 and 18. The output of the direct current amplifier 36 drives a reversible servomotor 38. The motor 38 is mechanically coupled with the output shaft 11 by any suitable drive connection 39.

The arrangement is such that the photocells 17 and 18 are oppositely monitored whereby when the photocells are equally illuminated, the voltages generated across the output terminals thereof will be of equal value and opposite polarity and cancel. In this instance, no electrical signal will be observed across the conductors 34 and the motor 38 will be de-energized. If, however, one of the photocells receives more light than the other, then the motor 38 will be energized to drive the output shaft 11 to reposition the photocells so that the same are equally illuminated. The direction of rotation of the output shaft will depend upon which of the photocells is receiving a greater amount of light. For the purpose of this discussion, it will be assumed that when the photocell 17 receives the greater amount of light, a positive control signal is supplied to the amplifier 36 which causes the motor 38 to drive the output shaft 11 in a counterclockwise direction. Conversely, when a larger area of the photocell 18 is illuminated, negative control signals supplied to the amplifier 36 will energize the motor 38 to drive the output shaft 11 in a clockwise direction. By definition, the clockwise and counterclockwise directions indicated in the drawings and throughout the following portions of the specification, are referenced from the driven end of input shaft 12 when looking toward the coupling means 10.

Rigidly mounted or keyed on the end of the input shaft 12 is a circular shutter disc 41. The shutter disc 41 is formed by a semicircle of transparent material 42 and a semicircle of opaque material 43 which are abutted along a diameter 44. Both the photocells 17 and 18 and the shutter 41 are disposed normally with respect to the axially aligned input and output shafts. It is a function of the shutter 41 to direct light emanating from a suitable source between the photocells 17 and 18 in accordance with the relative rotative positions of the input and output shafts.

A uniform light source is defined by a pair of electrical lamps 46 and 47 that are positioned to the input side of the shutter 41. The electrical lamps 46 and 47 are mounted on one end of a cylindrical housing 48 which, as shown in FIGURE 1 of the drawings, spans the shutter 41 and the photocells 17 and 18 and is rigidly mounted on the output shaft 11. The input shaft 12 is journaled for rotation with respect to the cylindrical housing 48 by means of a bearing 49. The electrical lamps 46 and 47 defining the light source are rotated with the output shaft 11 while the input shaft 12 rotates freely with respect thereto.

Electrical power is supplied to the electric lamps 46 and 47 from a suitable source of potential, not shown, by means of brushes 50 of the brush assembly 31 and a split commutator ring 51 on the output shaft 11. Suitable conductors, not particularly shown, extend within the hollow portion of the input shaft and along the side walls of the housing 48 to the electrical lamps 46 and 47. While in the illustrated embodiment of the invention the electrical power for the lamps 46 and 47 is supplied via the output shaft and across the photocells and the shutter, it will be apparent that the connections may be made from the input side of the coupling means and that the lamps may be stationarily mounted with respect to both the input and output shafts. In this manner, no physical interconnection is required between the input and output shafts. The light source may also include translucent plates of frosted glass if this is desired. In any event, a uniform light source capable of illuminating the entire circular area of the shutter 41 and the semicircular photocells 17 and 18 is provided.

The light source, shutter and light responsive devices are all enclosed by a cylindrical casing 53. The input and output shafts 12 and 11 are journaled by bearings 54 in the casing 53. The brush assembly 31 is shown to be mounted on one end wall of the casing 53.

Figure 2:
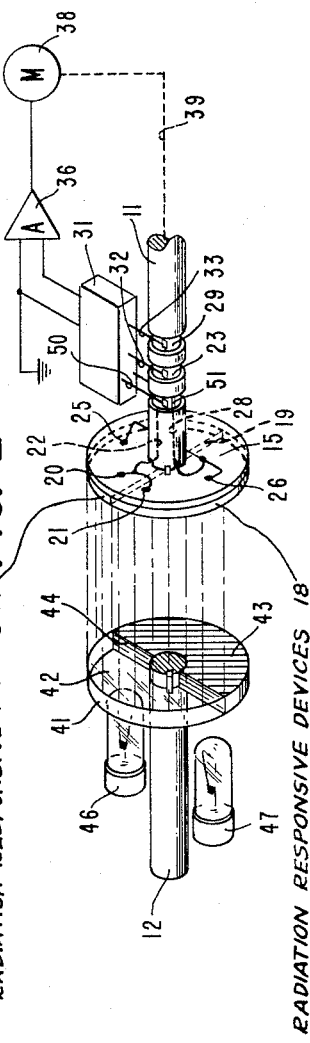
FIGURE 2 is a schematic illustration of the coupling means shown in FIGURE 1 in a stable null position.

Considering now the operation of the apparatus above described, FIGURES 1 and 2 of the drawings show the coupling means in a stable null position. The diameter 44 of the shutter 41 is disposed normally with respect to the diameter 19 defining the edges of the photocells 17 and 18. At this time the photocells are equally illuminated with each photocell being illuminated over half of its area. As previously indicated, the photocells 17 and 18 are oppositely monitored whereby no control signals will be supplied by the amplifier 36 to the motor 38 and the system is at rest. The output shaft is positioned in accordance with the angular rotative position of the input shaft.

Figure 3:
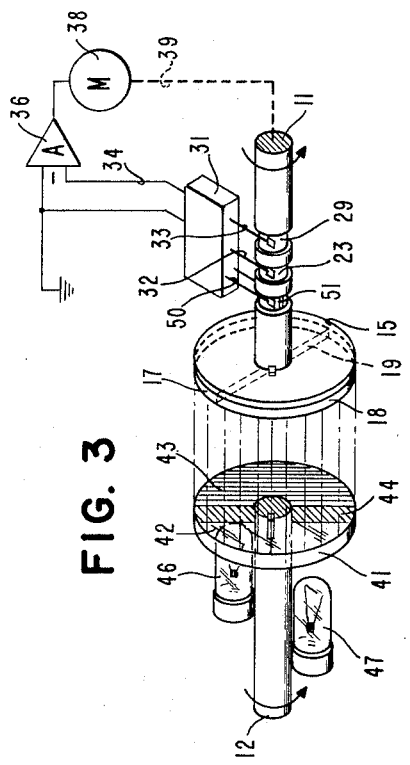
FIGURE 3 is a schematic illustration of the coupling means showing the relative position of the various components thereof after the input shaft starts to rotate clockwise from the stable null position.

FIGURE 3 illustrates the condition of the coupling means when a clockwise movement is applied to the input shaft. When this happens, the shutter 41 rotates clockwise and the transparent area 42 allows increased radiation from the light source to impinge on the photocell 18. Less light is allowed to strike the photocell 17 and this produces a net negative voltage which is supplied to the amplifier 36. The motor 38 through its mechanical connection 39 causes the output shaft 11 to rotate in a clockwise direction. This rotation causes a gradual reduction in the area of photocell 18 which is illuminated and a gradual increase in the area of photocell 17 which is illuminated. Eventually, equal areas of the photocells 17 and 18 will again be illuminated and a balanced stable null condition is again obtained. At this position the output shaft 11 has moved clockwise to an angular position coincident with the angular position of the input shaft 12.

Figure 4:
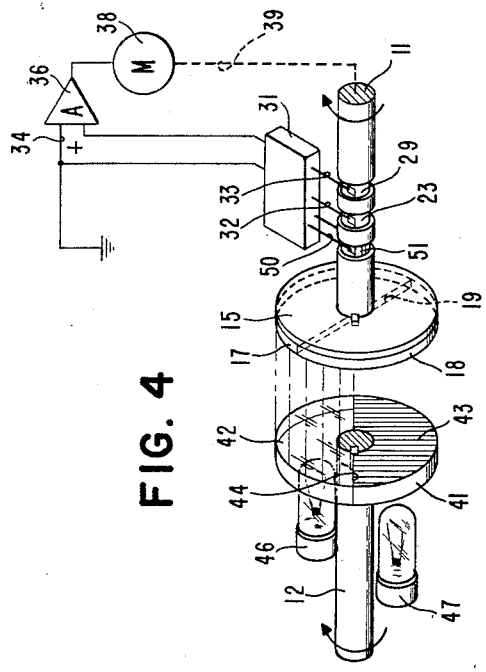
FIGURE 4 is a schematic illustration of the coupling means showing the relative position of the various components thereof after the input shaft starts to rotate counter clockwise from the stable null position.

FIGURE 4 illustrates the coupling means when a counterclockwise rotation has been applied to the input shaft 12. This counterclockwise movement causes increased illumination of photocell 17 and decreased illumination of the photocell 18. A positive output voltage is observed across the conductors 34 which causes the motor 38 to drive the shaft in a counterclockwise direction. The counterclockwise movement of output shaft 11 continues until a stable null condition is again obtained where the photocells receive equal illumination. Should the inertia of the system carry the output shaft beyond the angular position defining a stable null, the light response of the photocell 18 will increase, driving the output shaft in a clockwise direction until the stable null is reached.

Figure 5:
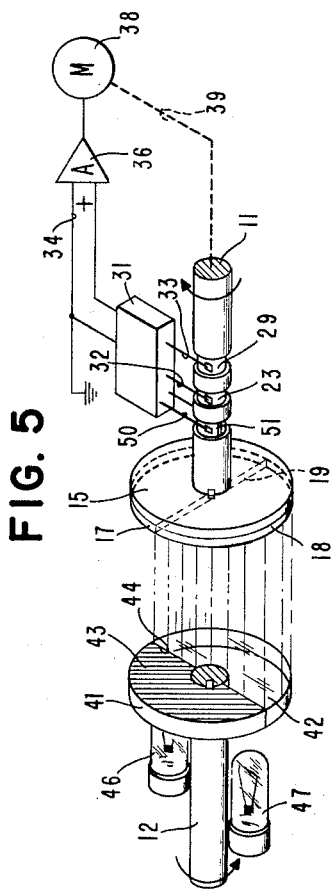
FIGURE 5 is a schematic illustration of the coupling means showing the position of the component parts at a false null and how such position is unstable.

FIGURE 5 illustrates the output shaft 11 at a false unstable null position 180° opposite the stable null position. It can be seen that at this unstable null position equal areas of the photocells are illuminated and the net output of the amplifier 36 is zero. However, slight movement of either the input or output shafts in a clockwise or counterclockwise direction will diminish the output of one or the other of the photocells which produces a net output to the amplifier 36. For example, any movement of the input shaft in a clockwise direction will cause the light transmission from the source to photocell 18 to decrease while the illuminated area of photocell 17 will increase. This provides a net positive output from the oppositely monitored photocells which causes the output shaft 11 to be driven in a counterclockwise direction. The output shaft is driven in the opposite direction from any movement applied to the input shaft when the coupling means is at an unstable false null position. The output shaft will continue to be driven with increased rapidity in a counterclockwise direction for 180° until the balanced stable null is reached. In the above example the photocell 17 will receive more and more light as the output shaft is driven in a counterclockwise direction toward the stable null position.

The photocells 17 and 18 each have characteristic curves wherein the output varies with respect to the area illuminated. The more area which is illuminated, the larger the output and, in the coupling means of the present invention, this characteristic is particularly useful. The control signals to the amplifier 36 will vary in accordance with the difference between the angular positions of the input and output shafts. For large angular differences the motor 38 will drive the output shaft in a proper direction at a fast rate while for small angular differences the output shaft will be driven at a much slower rate. This, of course, is highly desirable since the response of this system is greatly improved in that overtravel is minimized.

It is contemplated that the photocells will not be saturated when illuminated by the light source. In other words, a measurable change in output voltage must be available in response to either an increase or decrease in the area of illumination of a photocell. If the photocells were to saturate before the same were half illuminated, the false null condition would exist for rotational deviations from this condition since no net output voltage variation would be detected. When sensitive photocells are employed, it is possible to decrease the areas thereof which are illuminated by decreasing the size of the transparent area 42. For example, the transparent area 42 may comprise a quarter sector which is bisected by a line perpendicular to the diameter 44 at a stable null condition. The remaining three-quarters of the shutter would be opaque. In this instance, one-quarter of each of the photocells 17 and 18 would be illuminated. Also, the photocells do not necessarily need to be matched since the output shaft will stabilize at a position where the outputs of the photocells are equal and opposite even though different areas thereof are illuminated.

It should now be apparent that the objects initially set forth have been accomplished. Of particular importance is the provision of a torqueless coupling means for control systems which is characterized by the absence of a stable false null and by its simplicity in construction and operation. No physical connections of any kind are required between the input and output shafts whereby the same can be located on opposite sides of a transparent barrier as may be required when working in a radiation environment, for example. A pair of oppositely monitored photocells, a single shutter and a light source are all that is required to provide the coupling means of this invention. Although electric lamps and photocells have been utilized as the source and sensing means, other sources and sensing means known in the art are contemplated. For example, any source of radiation and any pair of oppositely monitored radiation responsive devices with means for blocking the radiation similar to the shutter illustrated could be utilized.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A coupling means for connecting spaced first and second movable members to cause one of said members to move in the same direction as the other of said members comprising; a source of radiation, a pair of radiation responsive devices, said radiation responsive devices being movable with one of said members, each of said radiation responsive devices defining a portion of an area, means to drive said one of said members in response to the comparative amount of radiation received by said radiation responsive devices, shutter means rotatable with the other of said members, said shutter means being disposed between said source of radiation and said radiation responsive devices, and said shutter means having areas transparent and opaque to radiation from said source such that relative movement between said members causes more radiation to impinge on one of said devices and less radiation to impinge on the other of said devices to actuate said means to drive.

2. A coupling means for connecting spaced first and second movable members to cause one of said members to move in the same direction as the other of said members comprising; a source of radiation, a pair of radiation responsive devices, said radiation responsive devices being movable with one of said members, each of said radiation responsive devices defining a portion of a planar area, means to drive said one of said members in response to the comparative areas of said radiation responsive devices which are illuminated by said source of radiation, shutter means rotatable with the other of said members, said shutter means being disposed between said radiation source and said radiation responsive devices, and said shutter means having areas transparent and opaque to radiation from said source such that relative movement between said members causes more radiation to impinge on one of said devices and less radiation to impinge on the other of said devices to actuate said means to drive.

3. Apparatus according to claim 2 further characterized in that said means to drive comprises a motor, electrical circuit means interconnecting said radiation responsive devices and said motor, and said electrical circuit means comprising commutator rings on said one of said members and a brush assembly.

4. Apparatus according to claim 2 further characterized in that said source of radiation comprises an electric lamp, a housing for said lamp, said one of said members being journaled in said housing, means to supply electrical power to said lamp, and said last-mentioned means comprising a commutator ring on said one of said members and a brush assembly.

5. Apparatus according to claim 2 further characterized in that said source, said shutter means, said radiation responsive devices and said movable members are axially aligned.

6. Apparatus according to claim 5 further characterized in that the axially aligned components are enclosed in a casing totally enclosing said components with the exception of extensions of said members, and bearings carried by said casing journaling said members.

7. A coupling means for connecting spaced input and output members to cause the output member to move the same amount and in the same direction as the input member comprising; reversible power means drivingly connected to said output member, a source of radiation, a pair of oppositely monitored radiation responsive devices movable with said output member, each of said radiation responsive devices defining half an area, shutter means rotatable with said input member, said shutter means being disposed between said radiation responsive devices and said source, and said shutter means having areas transparent and opaque to the radiation from said source such that when the input member position and the output member position correspond at a stable null position both of said radiation responsive devices receive equal amounts of radiation from said source and when said input member is rotated in either direction the movement of said shutter means allows the net output of said radiation responsive devices to change to energize said power means for driving in a respectively corresponding direction.

8. A coupling means for connecting axially aligned and spaced input and output shafts to cause the output shaft to move the same amount and in the same direction as the input shaft comprising; a reversible motor drivingly connected to said output shaft, a source of light, a pair of oppositely monitored photocells mounted on and rotatable with said output shaft, each of said photocells being semicircular in shape, said photocells being abutted to define a circular area, a circular shutter mounted on and rotatable with said input shaft, said shutter being disposed between said photocells and said light source, said shutter being half transparent and half opaque such that when the input shaft position and the output shaft position correspond at a stable null position both of said photocells are equally illuminated by said light source and when said input member is rotated in either direction the movement of said shutter allows the net output of said photocells to increase to drive said motor selectively in either direction, the parameters of said light source and said photocells being such that at maximum light reception said photocells will not be saturated, and the false null position diametrically opposite the stable null position being unstable due to any slight movement of the input or output shaft producing an unbalance in the reception of the photocells producing a net output and causing the motor to drive the output shaft back to the balanced stable null position.

References Cited in the file of this patent

UNITED STATES PATENTS

| | | |
|---|---|---|
| 1,976,648 | Wittkuhns | Oct. 9, 1934 |
| 2,167,484 | Berry | July 25, 1939 |
| 2,228,199 | Chance | Jan. 7, 1941 |
| 2,236,255 | Young | Mar. 25, 1941 |
| 2,364,908 | Miller | Dec. 12, 1944 |
| 2,480,134 | Harrington | Aug. 30, 1949 |
| 2,922,939 | Carter et al. | Jan. 26, 1960 |
| 3,060,360 | Tomek | Oct. 23, 1962 |